United States Patent Office 2,800,516
Patented July 23, 1957

2,800,516

9,11,13-OCTADECATRIENYL-1,4-DIOL AND OTHER ALCOHOLS DERIVED FROM OITICICA OIL

Glenn R. Wilson, Detroit, Mich., assignor to Ethyl Corporation, New York, N. Y., a corporation of Delaware No Drawing. Application December 31, 1953, Serial No. 401,711

2 Claims. (Cl. 260—635)

This invention pertains to novel compositions of matter and the production thereof, and in particular is concerned with the production of the alcohols derived from oiticica oil. The present application is in part a continuation of prior application Serial No. 369,701, filed July 22, 1953, and now abandoned.

Oiticica oil is obtained from the nuts of the Brazilian tree "*Licania rigida* Benth." Briefly, it is obtained from the nuts by extraction under pressure. In recent years, such extraction has developed to an extent where the oiticica oil obtained can be employed for such uses as a drying agent in paints and varnishes, in printing inks, and in some instances, as a vehicle. Oiticica oil has been hydrogenated to produce the alcohols obtainable therefrom. However, hydrogenation in addition to producing the alcohols, also destroys the drying qualities of the mixture obtained by resulting in an essentially saturated mixture. To the best of my knowledge, the mixture of alcohols obtainable from oiticica oil has not been produced by a process which results in a mixture retaining the original degree of unsaturation of the fatty acid portions of the starting material. As a result of my work in this field, I have found that novel compositions of matter can be obtained from oiticica oil which have many of the above and other diverse uses than those of the oil itself, or the hydrogenated derivatives thereof.

It is an object therefore of the present invention to provide new compositions of matter derived from oiticica oil. A further object of this invention is to provide a mixture of alcohols derived from said oil. A still further object is to provide the new compound, 9,11,13-octadecatrienyl-1,4-diol. Another object of this invention is to provide a process for the preparation of the foregoing compositions of matter. These and other objects will be apparent from the discussion hereinafter.

The novel compositions of this invention comprise a mixture of alcohols corresponding in the number of carbon atoms to the fatty acid radicals of oiticica oil, and the alcohol, 9,11,13-octadecatrienyl-1,4-diol. The compositions of this invention are obtained when oiticica oil is reduced by an alkali metal-reducing alcohol process. The mixture of alcohols obtainable by such a process is characterized in that the unsaturation of the original oil is retained. They are further characterized as having a percent hydroxyl of at least about 8.0, a saponification number not greater than 20.0, an acid number not greater than 5.0, and a Wijs iodine number of at least about 135.

This mixture of alcohols will contain as a major constituent, above about 70 percent by weight, 9,11,13-octadecatrienyl-1,4-diol. This new alcohol can be separated from the above mixture. Various means of separation can be employed such as, for example, distillation, fractional crystallization, liquid thermal diffusion, chromatographic adsorption, extractive crystallization, selective reactivity with certain compounds such as urea, extraction, or solvent partition, or a combination of two or more of these methods. Still other means of separation can be employed.

To demonstrate the preparation of the novel products of this invention, the following examples are presented wherein all parts and percentages are by weight.

*Example I*

The oiticica oil employed in this run analyzed as follows: saponification number, 200.3; acid number, 3.7; and percent carbonyl, about 7.5. To a reactor equipped with means for agitation, heating, reflux, and hold-up, were added about 45.3 parts of sodium dispersed in about 105 parts of isooctane. To this dispersion was added a mixture of 100 parts of oiticica oil, 100 parts of methylisobutylcarbinol, and 105 parts of isooctane over a period of about 33 minutes, while maintaining the reaction mixture at reflux temperature. During the addition period, about 105 parts of the isooctane volatilized was not permitted to return to the reaction vessel. At the completion of addition, the mixture was cooked for an additional 15 minutes. The reduction mixture was then added to about 350 parts of water under a nitrogen blanket in order to hydrolyze the alcoholates formed. The lower aqueous caustic layer was removed and the organic layer was washed with an additional 500 parts of water. The organic layer was then distilled in order to remove the reducing alcohol and isooctane therefrom. The 81.6 parts of product obtained represents a yield of 89.5 percent. Analysis of this product disclosed: saponification number, 14.9; acid number, 0.7; Wijs iodine number, 139.7; Klee and Benham iodine number, 177.7 (J. Am. Chem. Soc. 27, 130 (1950)); and percent carbonyl, 0.4.

*Example II*

The mixture of alcohols obtained from the preceding example is then subjected to fractional crystallization by heating to a uniform liquid and slowly cooling until the first solid layer is obtained. The liquid portion is removed therefrom. This portion is then mixed with sufficient petroleum ether for dissolution of the monohydroxy compounds and methanol is added thereto to take up the diol compound, and the mixture is agitated. When the agitation is stopped, the mixture separates into two layers. The upper petroleum ether layer is withdrawn and the lower methanol layer is then heated to remove the methanol therefrom. The product alcohol thus obtained contains about 77.2 percent carbon, 11.4 percent hydrogen, 11.4 percent oxygen, and has a percent hydroxyl of about 12.14 which corresponds to

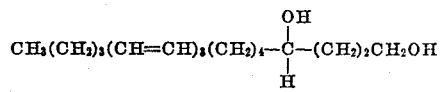

$$CH_3(CH_2)_3(CH=CH)_3(CH_2)_4-\underset{\underset{H}{|}}{\overset{\overset{OH}{|}}{C}}-(CH_2)_2CH_2OH$$

The petroleum ether layer which is removed can also be fractionated to recover the mixture of monohydroxy alcohols therefrom.

As noted above, other means of separation of 9,11,13-octadecatrienyl-1,4-diol can be employed, the foregoing example serving merely as an illustration.

The raw material from which the novel compositions are obtained will vary somewhat in analysis. It is to be understood that the mixture of alcohols of this invention includes the mixture obtained by a reduction process when treating the raw oil, oil which has been refined in various ways such as, for example, deacidification and the like, and oil which has been transesterified to result in monoesters of the fatty acids of oiticica oil. A typical analysis of oiticica oil is as follows:

|                                        | Percent |
|----------------------------------------|---------|
| Unsaturated fatty acid constituents    | 90      |
| Oleic                                  | 5.9     |
| Linoleic                               | 10.0    |
| Licanic                                | 74.1    |
| Saturated fatty acid constituents      | 10      |
| Palmitic                               | 5.0     |
| Stearic                                | 5.0     |
| Saponification number                  | 200.3   |
| Acid number                            | 3.7     |
| Percent carbonyl                       | 7.5     |

Oiticica oil comprises primarily triglycerides of the fatty acids. Therefore, the fatty acid constituent percentages above are percentages of the total fatty acid portion of the triglycerides. As noted, the fatty acid portion of the triglycerides comprises fatty acids containing 14 to 20 carbon atoms. The number of carbon atoms of the individual alcohols of the mixture will correspond to the number of carbon atoms of the fatty acids of the starting material with very little, if any, change of unsaturation. Because of the variance in analysis of the starting material, the molecular weight of the novel mixture of alcohols cannot be precisely defined. However, the molecular weight ordinarily will be greater than 250 and generally between about 260 and 300.

As mentioned above, the products of this invention are obtained by treating oiticica oil simultaneously with an alkali metal and a reducing alcohol. Briefly, the process involves reacting the fatty acid esters with an alkali metal and a reducing alcohol, hydrolyzing the alkali metal alcoholates thus formed, and separating the high molecular weight alcohols from the reducing alcohol, caustic, solvent, and glycerol, when the triglycerides are reduced. When transesterified oiticica is employed, the glycerol is previously separated. In a typical process, but by no means limiting, between about the stoichiometric equivalent amount and 5 percent excess of the alkali metal is employed over that required to produce the corresponding alcoholates. Similarly, between about the stoichiometric equivalent amount and 5 percent excess of a reducing alcohol is employed over the theoretical requirement. In determining these proportions both the carbonyl and acid functions should be taken into consideration. The alcoholates formed are hydrolyzed by treating with water and the product alcohols are separated therefrom.

In carrying out the above process to prepare the alcohol mixture of this invention, a preferred method is to utilize the alkali metal in the form of subdivided particles. Alkali metal dispersions which are well known in the art, are well suited for this purpose. These dispersions are prepared by melting the alkali metal in an inert organic medium which generally has a boiling point above the melting point of the alkali metal. During this operation the mixture is highly agitated in order to form the dispersion. Various dispersion media can be employed in preparing the alkali metal dispersions. Among such media are, for example, isooctane, toluene, xylene, dihydronaphthalene, petroleum fractions, heavy alkylates, and the like. Still other dispersion media can be employed, the foregoing serving merely as illustrative examples. The proportion of the alkali metal to the dispersion medium can be varied, and dispersions having metal concentrations from about trace quantities to about 60 percent by weight are common. It is preferred to utilize about a 50 percent by weight, or less, dispersion. Likewise, the particle size will vary wherein the solution will have particles averaging about 50 microns in size and smaller. It is preferred that the particle size average less than about 20 microns. Smaller particle sizes enhance the reaction rate and provide increased contact between the metal and the fatty acid esters and reducing alcohol. Although any of the alkali metals can be employed, sodium is preferred here, primarily because of its greater availability and economy.

The reducing alcohols employed when producing the compositions of this invention can be the primary, secondary, or tertiary alcohols. For example, lower molecular weight primary, secondary, or tertiary alcohols, such as those having less than about 10 carbon atoms can be used. Likewise, the alcohols produced by the reduction can be employed as reducing alcohols, and these include alcohols having from about 10 to 30 carbon atoms. However, it is preferred to utilize the secondary alcohols inasmuch as it has been found that they are less reactive toward the alkali metal and are quite suitable for use in ester reduction processes. Among such secondary alcohols are for example, propanol-2, butanol-2, pentanol-2, pentanol-3, methylisobutylcarbinol, 2-methylbutanol-3, hexanol-2, hexanol-3, phenylmethylcarbinol, phenylethylcarbinol, cyclopentanol, and cyclohexanol. Still other secondary alcohols can be employed, the foregoing serving merely as illustrative examples.

The solvent used in this process can be any solvent which is unreactive with the particular reactants of the process. In a preferred embodiment, the solvent which is employed is the same organic material utilized in the preparation of the alkali metal dispersion. However, other materials can be used to equal advantage. The proportion of the solvent employed can vary within wide limits. The proportion of solvent to ester can be between the limits of 0.25 and 5.0 to 1, and, preferably, between 0.25 and 1.3 to 1 part by weight.

Variations in the over-all ester reduction process can be made. It has been found that the oiticica oil can be transesterified, preferably with an alcohol corresponding to the reducing alcohol, prior to reduction. A preferred method of transesterifying the glycerides is to react them with an aliphatic alcohol in the presence of an alkaline alcoholysis catalyst. In this manner, the glycerine is separated prior to the actual ester reduction operation and is replaced by the esterifying alcohol. In this instance, a secondary alcohol is again preferred, such as, for example, methylisobutylcarbinol and the like. The newly formed esters are then reduced similar to the process as indicated above. The chemical reactions are essentially the same with exception that monoesters will be reduced rather than triglycerides. A particular advantage of this technique is that glycerine yield is greater and the secondary alcohol monoesters are more adaptable to an ester reduction process.

The novel compositions of this invention can be applied to a variety of uses. The mixture of alcohols can be sulfated or sulfonated. Various sulfation techniques can be employed which selectively sulfate only the hydroxyl radicals of the alcohols of this invention, or sulfation or sulfonation of both the hydroxyl radicals and the unsaturated portions can be employed. The foregoing products and their salts can be formulated for use as detergents, wetting agents, emulsifiers, and the like.

A still further use for the mixture comprises additives and additive intermediates for lubricants. Thus, for example, when the mixture of alcohols, or their derivatives, as for example, esters, metal salts, and the like, is added to mineral lubricating oils, it enhances their lubricating properties. Similarly, when the sulfated and sulfonated derivatives as mentioned above are employed in lubricating oils, improved lubricants are obtained.

Another use for the alcohols of this invention is in the paint and varnish industries. When the mixture is added to various paints or varnishes, the drying qualities of these materials are considerably enhanced. The mixture can also be added to other vehicles which are employed to result in improved formulations.

Because of the fact that the novel mixture of alcohols contains above about 70 percent by weight of a conjugated triene-diol compound, it is admirably suited for the preparation of various polymers. For example, when the mixture is subjected to polymerization conditions wherein the conjugated unsaturation is polymerized, a high molecular weight branched-chain polymer will be obtained. The alcohols can also be copolymerized with other compounds. Additionally, since a substantial proportion of the mixture comprises a dihydroxy compound, the mixture can be reacted with various difunctional compounds such as, for example, the dibasic acids, diesters, diamides, and the like, to result in polymers, which can be further subjected to polymerization through unsaturated linkages.

The novel mixture of this invention is also admirably suited as an intermediate for the production of other useful organic chemicals or mixtures thereof. For example, the double bonds of the unsaturated constituents can be subjected to any of the known reactions of double bonds to produce compounds such as epoxides, halogenated derivatives, a mixture of saturated alcohols, and the like. Further, the alcohols can be oxidized to produce the corresponding aldehydes and acids. A still further use of the mixture of alcohols of this invention is that it, and its ester and ether derivatives can be employed as a plasticizer composition.

Likewise, 9,11,13-octadecatrienyl-1,4-diol, which is also claimed in this invention, can be employed in the aforementioned uses for the mixture of alcohols, especially the polymerization of the double bonds and polymerization with difunctional compounds. When this compound is polymerized or copolymerized by either method, a high molecular weight polymer results which has utility as a fabricating material for various articles of manufacture.

Similarly, when the 9,11,13-octadecatrienyl-1,4-diol is separated from the alcohol mixture, the remaining mixture of alcohols is well suited for many uses. For example, when this fraction is sulfated or sulfonated, the resulting products or their salts can be employed as detergents, wetting agents, emulsifiers, and additives for lubricating oils having improved characteristics. This fraction, namely, a mixture of alcohols obtained from the fatty acid esters of oiticica oil by a reduction process which contains essentially no triene-diol compound or from which substantially all of the triene-diol compound has been removed, can be employed for other uses set forth above. Still other uses for the novel compositions of this invention will be evident to those experienced in the art.

Having thus described the novel compositions of this invention and a process for their manufacture, it is not intended that it be limited except as noted and prescribed in the following claims.

I claim:

1. As a new composition of matter, a mixture consisting essentially of higher molecular alcohols corresponding in the number of carbon atoms and in substantially the same percentages by weight as the fatty acid radicals of oiticica oil, obtained by reducing oiticica oil by an alkali metal-alcohol reduction process.

2. As a new composition of matter, 9,11,13-octadecatrienyl-1,4-diol.

References Cited in the file of this patent

UNITED STATES PATENTS

| | | |
|---|---|---|
| 2,104,803 | Henke et al. | Jan. 11, 1938 |
| 2,121,580 | Berliner et al. | June 21, 1938 |
| 2,579,257 | Hansley et al. | Dec. 18, 1951 |
| 2,607,806 | Bigot | Aug. 19, 1952 |
| 2,647,932 | Blinka et al. | Aug. 4, 1953 |

OTHER REFERENCES

Jamieson: Vegetable Fats and Oils, 1943, 2nd ed., pp. 286 to 288.

Hansley: Ind. Eng. Chem., vol. 39 (1947), pp. 55–62.

Hilditch: "Industrial Fats and Waxes," 3rd ed., Balliere, Tindall and Cox, London, 1949; pp. 117, 138–143, 177–9, 536–8.